(12) United States Patent
Stiglmaier (10) Patent No.: US 10,024,402 B2
(45) Date of Patent: Jul. 17, 2018

(54) CHAIN DRIVE ASSEMBLY WITH TENSIONING-RAIL MOUNTING AID

(71) Applicant: iwis motorsysteme GmbH & Co. KG, München (DE)

(72) Inventor: Franz Stiglmaier, München (DE)

(73) Assignee: IWIS MOTORSYSTEME GMBH & CO. KG, München (DE)

( * ) Notice: Subject to any disclaimer, the term of this patent is extended or adjusted under 35 U.S.C. 154(b) by 196 days.

(21) Appl. No.: 15/270,972

(22) Filed: Sep. 20, 2016

(65) Prior Publication Data

US 2017/0089431 A1 Mar. 30, 2017

(30) Foreign Application Priority Data

Sep. 24, 2015 (DE) .......................... 10 2015 012 498

(51) Int. Cl.
*F16H 7/08* (2006.01)
*F16H 7/06* (2006.01)
*F16H 7/18* (2006.01)

(52) U.S. Cl.
CPC ................ *F16H 7/08* (2013.01); *F16H 7/06* (2013.01); *F16H 7/18* (2013.01); *F16H 2007/0844* (2013.01); *F16H 2007/0872* (2013.01); *F16H 2007/0874* (2013.01); *F16H 2007/0893* (2013.01)

(58) Field of Classification Search
CPC ..... F16H 7/08; F16H 7/18; F16H 7/06; F16H 2007/0844; F16H 2007/0872; F16H 2007/0874; F16H 2007/0893
See application file for complete search history.

(56) References Cited

U.S. PATENT DOCUMENTS

| 5,662,540 A * | 9/1997 | Schnuepke | F01L 1/02 474/111 |
| 6,322,470 B1 * | 11/2001 | Markley | F16H 7/08 474/111 |
| 2003/0144101 A1 * | 7/2003 | Konno | F16H 7/08 474/111 |
| 2004/0058763 A1 * | 3/2004 | Konno | F16H 7/08 474/111 |

(Continued)

FOREIGN PATENT DOCUMENTS

| DE | 44 37 926 C1 | 2/1996 |
| DE | 103 04 186 A1 | 8/2003 |

(Continued)

*Primary Examiner* — William E Dondero
*Assistant Examiner* — Robert T Reese
(74) *Attorney, Agent, or Firm* — Baker & Hostetler LLP (57) ABSTRACT

A chain drive assembly for an internal combustion engine comprises a tensioning rail supportable on an engine block so as to be pivotable about a pivot bearing axle and further comprises a pivot bearing that can be provided on the engine block. The tensioning rail having a projection, which protrudes from the tensioning rail relative to the support body, so as to hold, at least during mounting, the tensioning rail at a mounting position. Additionally, the invention relates to the use of such a tensioning rail for mounting on the engine block of an internal combustion engine as well as to a bipartite chain drive of an internal combustion engine and a suitable mounting method.

13 Claims, 5 Drawing Sheets

(56) References Cited

U.S. PATENT DOCUMENTS

| | | | |
|---|---|---|---|
| 2009/0036242 A1* | 2/2009 | Hayami | F16H 7/18 474/111 |
| 2010/0062887 A1* | 3/2010 | Bodensteiner | F16H 7/08 474/111 |
| 2012/0225744 A1* | 9/2012 | Markley | F16H 7/08 474/111 |

FOREIGN PATENT DOCUMENTS

| | | |
|---|---|---|
| DE | 103 44 013 A1 | 4/2004 |
| DE | 10 2004 014 486 A1 | 10/2005 |
| DE | 10 2010 005 405 A1 | 7/2011 |
| JP | 2000-274500 A | 10/2000 |

\* cited by examiner

CHAIN DRIVE ASSEMBLY WITH TENSIONING-RAIL MOUNTING AID

CROSS-REFERENCE TO RELATED APPLICATION

This application claims priority to foreign German patent application No. DE 10 2015 012 498.6, filed on Sep. 24, 2015, the disclosure of which is incorporated by reference in its entirety.

FIELD OF THE INVENTION

The present invention relates to a chain drive assembly for an internal combustion engine, comprising a tensioning rail supportable on an engine block so as to be pivotable about a pivot bearing axle and further comprising a pivot bearing that can be provided on the engine block, said tensioning rail having a support body and a sliding-contact surface for contacting a driving chain. The invention additionally relates to the use of such a tensioning rail for mounting on the engine block of an internal combustion engine as well as to a bipartite chain drive for an internal combustion engine and a suitable mounting method.

BACKGROUND

In modern internal combustion engines, tensioning rails, which are supported via a pivot bearing provided on the engine block, are used for various applications, e.g. for the timing chain drive, and also for drives of ancillary units, e.g. of the oil pump and the air conditioning compressor. Whereas in a chain drive of the type in question, the associated guide rail is fixedly arranged at a specific position, where it ensures reliable guidance of the driving chain, tensioning rails are supported, by means of the pivot bearing provided on the engine block, such that they are pivotable relative to the driving chain so as to tension the driving chain in the chain drive with the aid of a chain tensioner. An increasing number of units to be driven in combination with an identically sized installation space or an installation space of reduced size leads to an increasing complexity of the engine and an increasing complexity of engine component mounting in the case of modern engines.

DE 44 37 926 C1 discloses a device for tensioning the chain of an internal combustion engine, in the case of which a tensioning arm for an oil pump chain is supported on a bolt fixed in the internal combustion engine, said bolt being also used as a point of support of a guide rail of the control drive. The guide rail of the timing chain drive and the tensioning rail of the auxiliary chain drive are here extended in length so as to unite the two points of support, which would otherwise be necessary, in one pivot bearing and so as to allow a joint support on an extended pivot bearing bolt secured in position on the engine block.

A combined tensioning and guiding device is described in DE 10 2004 014 486 A1, in the case of which a pivot pin is provided on an extension of the guide rail, the associated tensioning rail being pivotably supported on said pivot pin. In addition, the joint between the guide rail and the tensioning rail is provided with a lock against rotation.

Reference DE 10 2010 005 405 A1 discloses a mounting unit for a chain drive with a guide rail and a tensioning rail. The guide rail comprises two legs, which extend laterally in parallel to one another and the ends of which are provided with two spaced apart openings. The tensioning rail comprises a complementarily configured bearing sleeve, which is introduced in said openings and locked in position therein during operation.

The chain drive assemblies for internal combustion engines known from the prior art exhibit different mounting concepts with a fixed arrangement of the tensioning and guide rails to be installed, with a predetermined configuration, in a chain drive of an internal combustion engine. With respect to the increased complexity of internal combustion engines, the installation of such mounting units often necessitates the use of complicated constructions, since the possibilities of attaching them to the engine block become lesser due to the complexity of the engine. Hence, new mounting concepts for attachment parts and chain drives are necessary. The number of components or multifunctional components used should here be as small as possible, so as to allow an expedient utilization of such new chain drives and components in combination with a modern internal combustion engine.

Moreover, especially in the field of automobile industry, there is a high innovation pressure, which finds expression in continuous endeavors to improve and optimize components and their incorporation into internal combustion engines that get more and more complicated. Chain drives and tensioning rails are, in addition to the aspect that they are designed for special engines, mass products with respect to the high piece numbers for individual engines, such mass products necessitating a continuous improvement of the structural design and of the mounting efforts required.

SUMMARY OF THE INVENTION

Hence, it is the object of the present invention to provide a chain drive assembly of the type specified at the beginning, which exhibits an optimized structural design, which can be produced and mounted at a reasonable price and which takes into account the increased complexity of modern internal combustion engines.

According to the present invention, this object is achieved in that the engine block has provided thereon an assembly opening and that the tensioning rail comprises at least one projection arranged on the support body of the tensioning rail and protruding in the direction of the engine block relative to said support body, wherein the at least one projection is accommodated in the assembly opening on the engine block so as to hold, at least while the tensioning rail is being mounted on the engine block, the tensioning rail at a mounting position on the engine block. The tensioning rail can here be placed at its mounting position during mounting of the chain drive on the engine block, without the necessity of holding the tensioning rail by a technician or a mounting device. This allows unhindered positioning of the driving chain of the chain drive assembly, whereby the sequence of mounting steps will be simplified and the mounting costs will be reduced. The tensioning rail may here be configured as an integral component comprising a sliding-contact surface formed on a support body or it may be configured such that it comprises a separate sliding body which is fixed or fixedly connected to the support body for contact with the driving chain. In addition, the support body may be stiffened, at least partially, via a truss structure and it may be provided with a press-on area for contact with a chain tensioner.

According to a preferred embodiment, the at least one projection is a cylindrical projection, which is arranged concentrically around the pivot bearing axle. Such a cylindrical projection can more easily be introduced in a complementary cylindrically configured assembly opening on the engine block and has to be pivoted to the predetermined mounting position only after it has been arranged on the engine block. In order to avoid a displacement when the tensioning rail supported by means of the pivot bearing axle is being pivoted during operation of the engine, the projection should be arranged concentrically around the pivot bearing axle of the tensioning rail. In the field of technology, tensioning rails are known, which comprise pivot bearing sleeves that project relative to the lateral surfaces of the support body, so as to guarantee through the contact between the projection and the engine block a sufficient distance between the driving chain and the engine block, cf. in particular DE 103 44 013 A1. According to an expedient embodiment, the cylindrical projection is formed integrally with the support body, so that a separate production of the cylindrical projection as well as pre-mounting of the cylindrical projection on the support body can be dispensed with.

According to an advantageous embodiment, the assembly opening on the engine block is configured as a pivot bearing opening and the cylindrical projection is configured as a pivot bearing bolt, the cylindrical projection being pivotally supported in the assembly opening so as to define the pivot bearing. Configuring the cylindrical projection as a pivot bearing bolt makes it possible to dispense with an additional bearing bolt and a complementary pivot bearing opening in the tensioning rail and the projection, respectively, and allows thus synergy effects between mounting and bearing components. Simple fastening means can here be used for fixing the tensioning rail to the engine block.

According to a variant of the chain drive assembly, the tensioning rail, preferably a cylindrical projection of the tensioning rail, includes a pivot bearing opening, and a pivot bearing bolt is provided, which extends through the pivot bearing opening so as to define the pivot bearing. The provision of a separate pivot bearing bolt as well as of an associated pivot bearing opening coaxially with the pivot bearing axle allows, during operation, free, contactless guidance of the projection, in particular of a cylindrical projection, in the assembly opening, so that the projection accommodated in the assembly opening on the engine block for the purpose of mounting the tensioning rail will not fulfil any function during operation. Preferably, the here necessary pivot bearing bolt may be provided with a centering cone, which, when the pivot bearing bolt is being fixed in the engine block, presses against a respective shoulder in the pivot bearing opening and forces the projection in the assembly opening from a mounting position into a free, side-contactless position.

According to another embodiment, a second tensioning rail is provided in addition to the first tensioning rail, said second tensioning rail being supported such that it is pivotable about the pivot bearing axle of the pivot bearing of the first tensioning rail, wherein the first tensioning rail has provided thereon, on the side of the support body located opposite the at least one projection, at least one holding element for holding the second tensioning rail at a mounting position on the first tensioning rail while the second tensioning rail is being mounted on the engine block. This allows easy mounting of tensioning rails, which are pivotably supported on an engine block via the same pivot bearing axle, especially in cases of a limited accessibility in the direction of the pivot bearing axle. Through the first tensioning rail held at a mounting position on the engine block by the projection accommodated in an assembly opening on the engine block, the second tensioning rail can be held at a mounting position on the first tensioning rail via the at least one holding element on the support body of the first tensioning rail, and can thus also be reliably positioned relative to the engine block. Thus, it is possible to pass a suitable pivot bearing bolt through the pivot bearing openings on the first and second tensioning rails and to fix the first and second tensioning rails on the engine block, since the tensioning rails are reliably held at their mounting positions. For a simple structural design, the at least one holding element may be configured as a projection protruding on the support body of the first tensioning rail in the direction of the second tensioning rail relative to the support body. Preferably, the at least one projection is formed integrally with the support body and/or configured as a locking element for fixing the second tensioning rail. In addition, for allowing a better positioning of the second tensioning rail, at least two holding elements may be provided, which will reduce additional holding efforts on the part of the technician when the second tensioning rail is being fastened.

The present invention additionally relates to the use of a tensioning rail, of the type explained in more detail hereinbefore, for mounting on an engine block of an internal combustion engine, with at least one projection arranged on a support body of the tensioning rail and protruding in the direction of the engine block relative to the support body, the at least one projection being inserted into an assembly opening on the engine block so as to hold the tensioning rail at a mounting position. Fixing the tensioning rail at the mounting position on the engine block allows positioning of the driving chain of the chain drive and of other components before the tensioning rail is fixed on the engine block by means of a pivot bearing bolt or a fastener. According to an advantageous embodiment, the at least one projection may be a cylindrical projection, which is arranged concentrically around the pivot bearing axle and which is inserted into a cylindrically configured assembly opening on the engine block so as to hold the tensioning rail at a mounting position. A cylindrically configured projection allows the tensioning rail to be more easily arranged on and oriented relative to the engine block and may, optionally, also be used as a pivot bearing bolt.

According to a further embodiment, the first tensioning rail, which comprises at least one projection accommodated in an assembly opening of the engine block, can be used for mounting a second tensioning rail of a bipartite chain drive on the engine block, wherein the first tensioning rail has provided thereon, on the side of the support body located opposite the at least one projection, at least one holding element, and the second tensioning rail rests on the holding element of the first tensioning rail at a mounting position, so as to fix the second tensioning rail simultaneously with the first tensioning rail on the engine block. The use of this first tensioning rail simplifies the mounting of bipartite chain drives including first and second tensioning rails which have the same pivot bearing axle, so that, even in the case of reduced accessibility, the first and second tensioning rails and the first and second chain drives can be mounted without making use of a fixing tool or of other mounting aids.

The present invention additionally relates to a mounting method for a bipartite chain drive of an internal combustion engine, comprising a first tensioning rail and a second tensioning rail, which are supported so as to be pivotable about a joint pivot bearing axle of a pivot bearing provided on the engine block, wherein the engine block has provided thereon an assembly opening, the first tensioning rail includes at least one projection protruding in the direction of the engine block relative to the support body of the first tensioning rail, and said first tensioning rail additionally includes at least one holding element provided on the side of the support body located opposite the at least one projection. The mounting method comprises the steps of arranging the at least one projection of the first tensioning rail in the assembly opening on the engine block, positioning the first driving chain of the first chain drive along the first tensioning rail, arranging the second tensioning rail on the at least one holding element of the first tensioning rail, orienting the bearing openings of the first and second tensioning rails concentrically with the pivot bearing axle, inserting the bearing bolt into the bearing openings of the first and second tensioning rails, and fixing the bearing bolt in position in the engine block. This simple mounting method allows, without the use of any additional fixing tool or of other mounting aids, not only the arrangement of the first and second tensioning rails at suitable mounting positions but also a fast and uncomplicated mounting of the whole bipartite chain drive including the two driving chains on the engine block of the internal combustion engine. According to an advantageous embodiment, the at least one projection may be a cylindrical projection that is arranged concentrically around the pivot bearing axle, and the assembly opening may be a cylindrical assembly opening formed concentrically with the pivot bearing axle. The cylindrical design of the projection and of the assembly opening facilitates the arrangement and the positioning of the components of the bipartite chain drive, thus accelerating also the mounting method.

Moreover, the present invention relates to a bipartite chain drive for an internal combustion engine, comprising a first tensioning rail and a second tensioning rail, wherein said first tensioning rail and said second tensioning rail are adapted to be supported such that they are pivotable about a pivot bearing axle of a pivot bearing provided on the engine block of the internal combustion engine, and wherein the first tensioning rail comprises a cylindrical projection which is arranged concentrically around the pivot bearing axle and which projects in the direction of the engine block relative to the support body of the first tensioning rail, wherein the cylindrical projection is adapted to be accommodated in an assembly opening on the engine block so as to hold the first tensioning rail at a mounting position while said first tensioning rail is being mounted on the engine block, and wherein the first tensioning rail has provided thereon, on the side of the support body located opposite the cylindrical projection, at least one holding element so as to hold the second tensioning rail at a mounting position on the first tensioning rail while said second tensioning rail is being mounted on the engine block. Together with the first tensioning rail also the driving chain of the first chain drive, which is wrapped around the chain wheels, can be mounted and the second tensioning rail can be held at a mounting position relative to the first tensioning rail, before the first and second tensioning rails are fixed to the engine block. Hence, such a bipartite chain drive can be mounted easily and reliably on the engine block of the internal combustion engine with the aid of simple means and without making use of an additional fixing tool.

BRIEF DESCRIPTION OF THE DRAWINGS

In the following, an embodiment of the present invention will be explained in more detail making reference to the enclosed drawings, in which.

DETAILED DESCRIPTION

Figure 1:
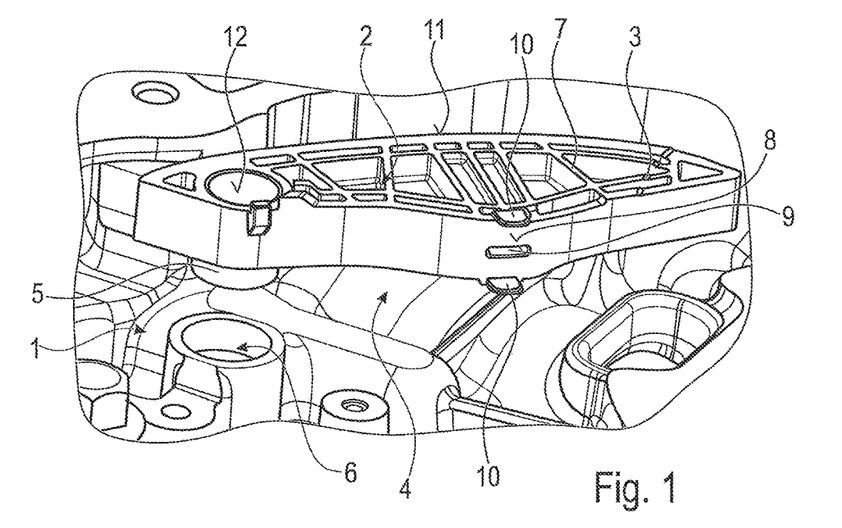
FIG. 1 shows a perspective view of a tensioning rail of a chain drive assembly according to the present invention.

The chain drive assembly 1 shown in FIG. 1 comprises a tensioning rail 2 with a cylindrical projection 5 protruding from the support body 3 of the tensioning rail 2 in the direction of the engine block 4 and a cylindrical assembly opening 6 formed in the engine block 4 and used for receiving therein the cylindrical projection 5. The support body 3 of the tensioning rail 2 has, on the visible upper surface and on the back (not shown), a plurality of truss members 7 for stiffening the tensioning rail 2. The lower surface of the tensioning rail 2 has provided thereon, in the press-on area 8, an opening 9 used for receiving therein the engine oil exiting from a chain tensioner 23, and two lateral guide projections 10 for guiding the chain tensioner 23 in the area of the press-on area 8. On the tensioning side facing away from the lower surface of the tensioning rail 2, a sliding-contact surface 11 is provided, which serves to contact and guide the driving chain 21. The cylindrical projection 5 on the tensioning rail back facing the engine block 4 is arranged coaxially with the pivot bearing axle through the pivot bearing opening 12 of the tensioning rail 2, the pivot bearing opening 12 extending also through the cylindrical projection 5.

The engine block 4 has provided thereon a cylindrical assembly opening 6, which is incorporated in the engine block 4, e.g. cut or bored thereinto, the inner wall of the assembly opening 6 defining a loose fit relative to the cylindrical projection 5 of the tensioning rail 2, the amount of play of said loose fit being approx. 0.5 mm. Thus, the cylindrical projection 5 can easily be arranged in the assembly opening 6 and moved during the assembly operation, without taking the risk of an axial displacement relative to the pivot bearing in the pivot bearing opening 12 during operation.

Figure 2:
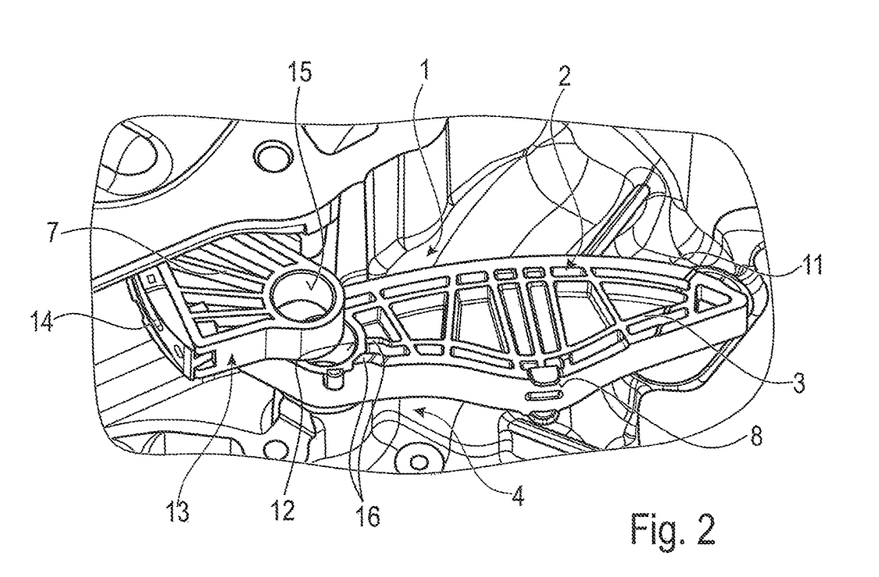
FIG. 2 shows a perspective view of the tensioning rail according to FIG. 1, arranged on the engine block.

FIG. 2 shows the tensioning rail 2 at a mounting position on the engine block 4, at which the cylindrical projection 5 is accommodated in the assembly opening 6 on the engine block 4. In addition, a part of a second tensioning rail 13 including a sliding body 14 for guiding an associated driving chain (not shown) can be seen. On the second tensioning rail 13, a second pivot bearing opening 15 can be seen, which is supported by means of truss members 7 relative to the tensioning side of the second tensioning rail 13, said tensioning side being provided with the sliding body 14. The tensioning rail 2 arranged in the assembly opening 6 has provided thereon, on the tensioning rail upper surface located opposite the cylindrical projection 5, three stop projections 16 protruding relative to the support body 3 on the upper surface of the tensioning rail 2 and defining a stop for the second tensioning rail 13 in the area of the pivot bearing opening 15, so that the pivot bearing opening 12 of the first tensioning rail 2 and the second pivot bearing opening 15 of the second tensioning rail 13 are in alignment with one another.

Figure 3:
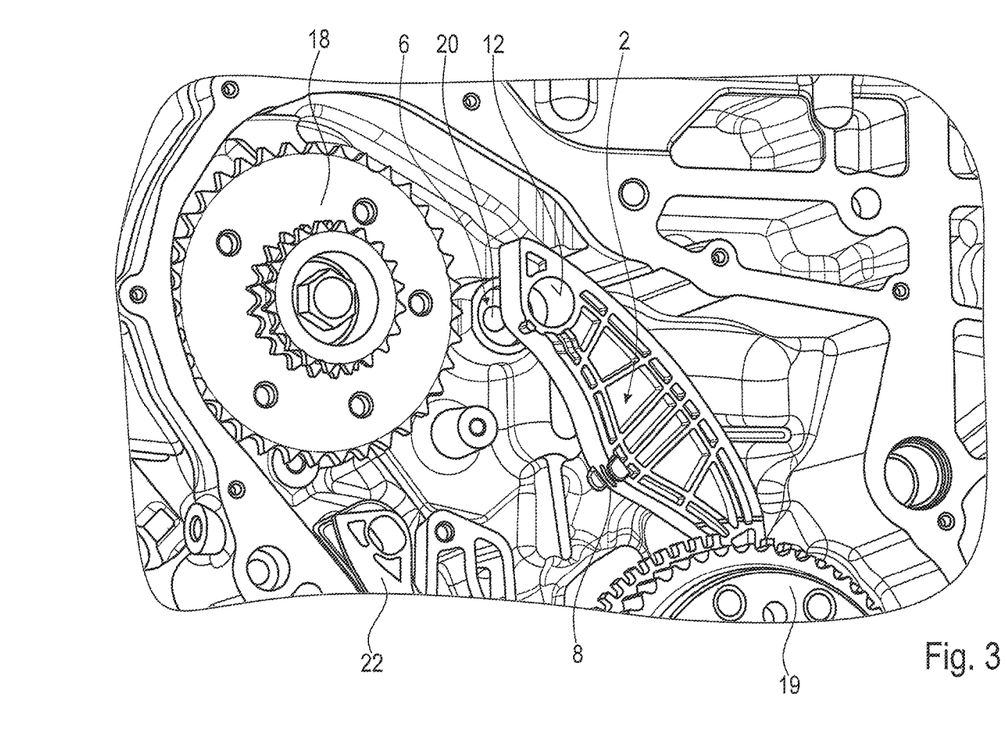
FIG. 3 shows a perspective top view of a chain drive assembly according to the present invention, in a first mounting step.
Figure 4:
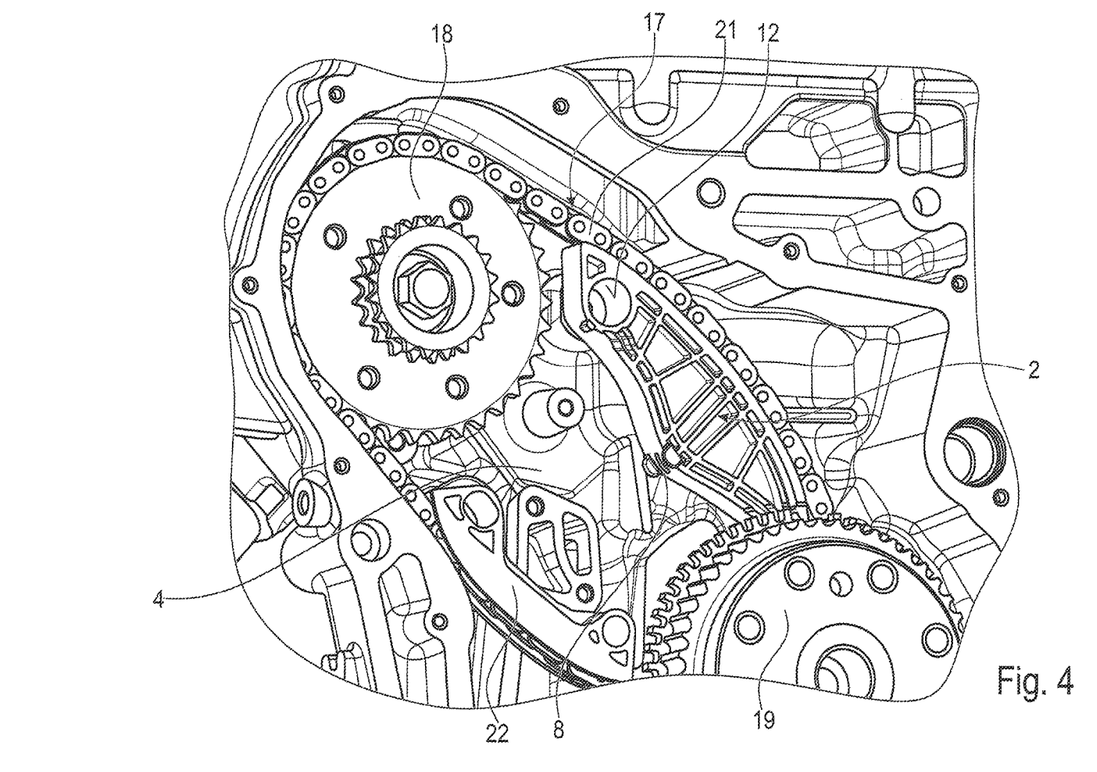
FIG. 4 shows a perspective top view of the chain drive assembly according to the present invention as shown in FIG. 3, in a second mounting step.

The mounting method shown in FIGS. 3 to 6 shows perspective top views of a bipartite drive with tensioning rails 2, 13 having the same pivot bearing axle. FIG. 3 shows a chain drive assembly 1 in a first mounting step. The tensioning rail 2 of the first, lower chain drive 17 is positioned between the first driving chain wheel 18 and the first driven chain wheel 19 such that the cylindrical projection 5 facing the engine block 4 is introduced in the cylindrical assembly opening 6 on the engine block 4. In addition, the assembly opening 6 has provided therein a threaded hole 20, in which a pivot bearing bolt 24 can be secured in position. After having established the first tensioning rail 2 at a mounting position on the engine block 4 through insertion of the cylindrical projection 5 in the assembly opening 6, the first driving chain 21 of the first chain drive 17 can be wrapped around the first driving chain wheel 18, the first driven chain wheel 19, the first tensioning rail 2 and the first guide rail 22, cf. FIG. 4. In so doing, the technician need not additionally fix the first tensioning rail 2 when applying the driving chain 21, since, through the cylindrical projection 5 and the assembly opening 6, it is sufficiently held at the mounting position on the engine block 4.

Figure 5:
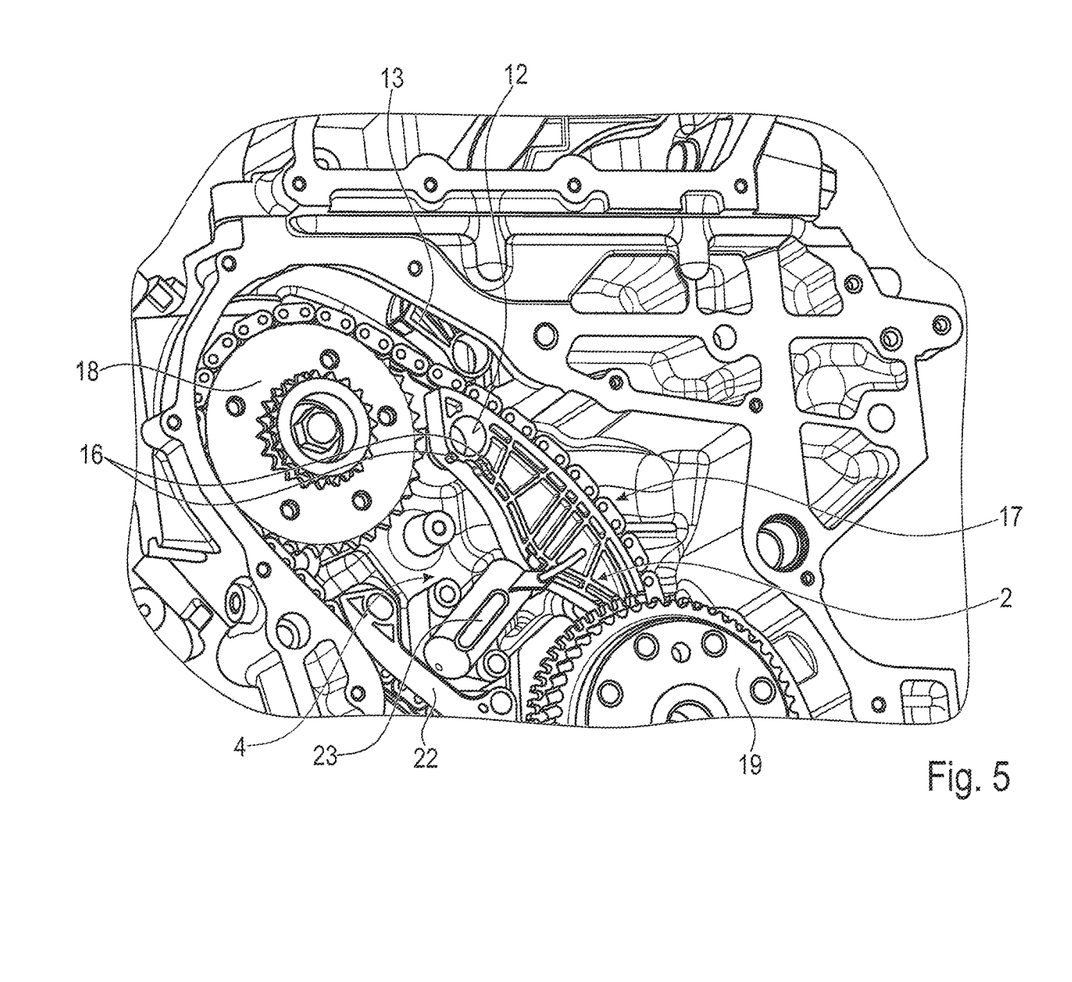
FIG. 5 shows a perspective top view of the chain drive assembly according to the present invention as shown in FIG. 3, in a third mounting step.

For finishing the assembly of the first chain drive 17, a chain tensioner 23 is arranged between the guide rail 22 and the tensioning rail 2, as shown in FIG. 5, the tensioning piston (not shown) of said chain tensioner 23 pressing onto the press-on area 8 of the tensioning rail 2 and securing via the guide projections 10 the arrangement of the tensioning rail 2 via the cylindrical projection 5 in the assembly opening 6.

Figure 6:
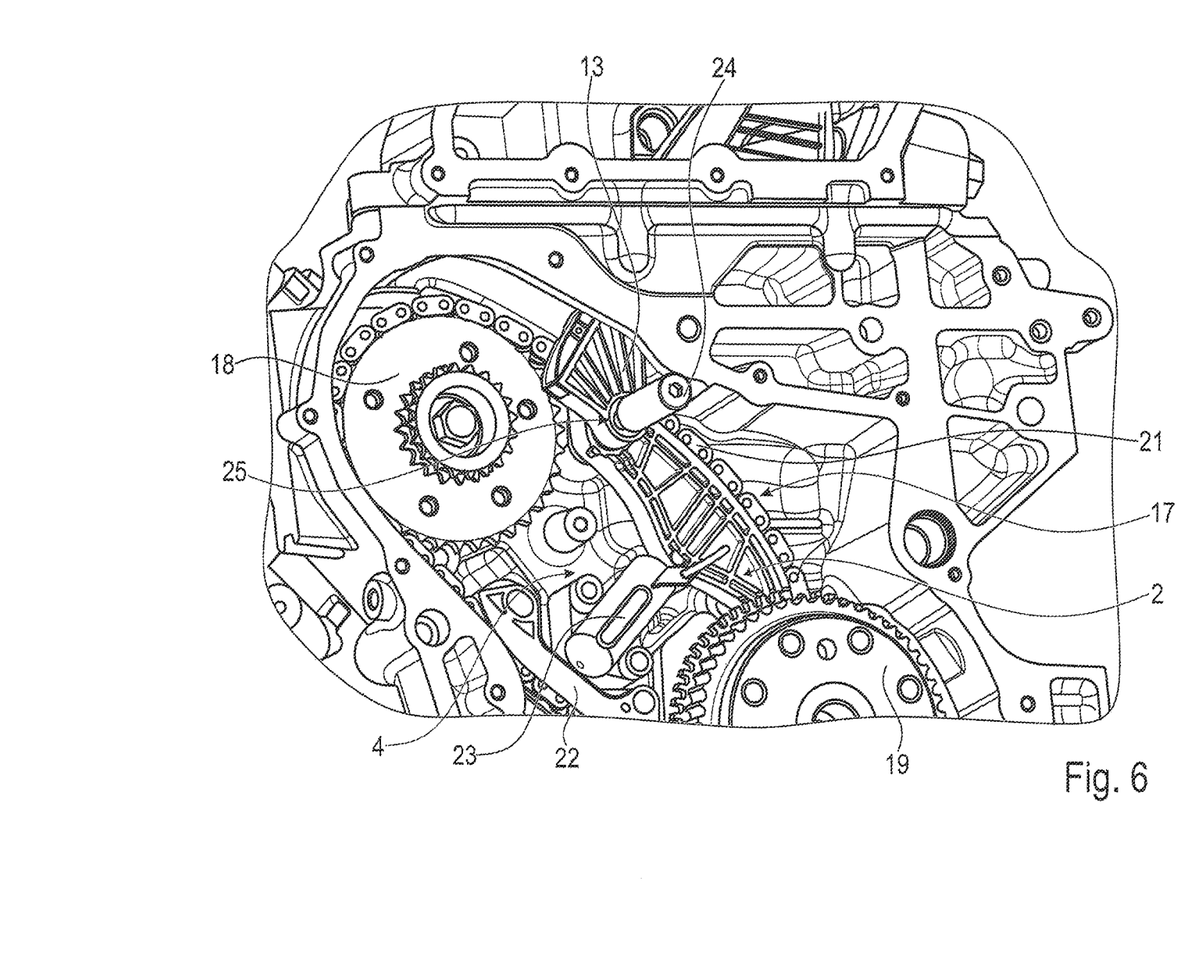
FIG. 6 shows a perspective top view of the chain drive assembly according to the present invention as shown in FIG. 3, in a fourth mounting step.

The next mounting step shown in FIG. 6 and carried out for installing a bipartite chain drive in an internal combustion engine shows the arrangement of the second tensioning rail 13 of the second chain drive in the area of the pivot bearing opening 12 of the first tensioning rail 2, the second tensioning rail 13 resting on the stop projections 16 arranged around the pivot bearing opening 12. When the second tensioning rail 13 has been arranged at the mounting position on the first tensioning rail 2, the pivot bearing bolt 24 which is common to the first tensioning rail 2 and the second tensioning rail 13 can be inserted through the first pivot bearing opening 12 and the second pivot bearing opening 15 and fixed in position in the threaded hole 20 on the engine block 4, so as to define the pivot bearing 25 for the first tensioning rail 2 and the second tensioning rail 13. In the course of this process, the circumferential surface of the cylindrical projection 5, which is provided on the first tensioning rail 2 and arranged in the assembly opening 6 with a loose fit, is transferred to a contact-free position, so that the cylindrical projection 5 in the assembly opening 6 will be functionless during operation. Subsequently, the driving chain of the second chain drive (not shown) can be mounted safely and easily and can be fixed by means of a second chain tensioner.

LIST OF REFERENCE NUMERALS 1 chain drive assembly
2 tensioning rail
3 support body
4 engine block
5 cylindrical projection
6 assembly opening
7 truss members
8 press-on area
9 opening
10 guide projections
11 sliding-contact surface
12 pivot bearing opening
13 second tensioning rail
14 sliding body
15 pivot bearing opening
16 stop projections
17 first chain drive
18 driving chain wheel
19 driven chain wheel
20 threaded hole
21 driving chain
22 guide rail
23 chain tensioner
24 pivot bearing bolt
25 pivot bearing

The invention claimed is:

1. A chain drive assembly for an internal combustion engine, comprising a tensioning rail pivotable supportable about a pivot bearing axle on an engine block and further comprising a pivot bearing that can be provided on the engine block, said tensioning rail having a support body and a sliding-contact surface for contacting a driving chain,
wherein the tensioning rail comprises at least one projection arranged on the support body of the tensioning rail and protruding in the direction of the engine block relative to said support body, wherein the at least one projection is arrangable in an assembly opening on the engine block so as to hold, at least while the tensioning rail is being mounted on the engine block, the tensioning rail at a mounting position relative to the engine block.

2. The chain drive assembly according to claim 1,
wherein the at least one projection is a cylindrical projection, which is arranged concentrically around the pivot bearing axle.

3. The chain drive assembly according to claim 2,
wherein the cylindrical projection is formed integrally with the support body.

4. The chain drive assembly according to claim 2,
wherein the assembly opening on the engine block is configured as a pivot bearing opening and the cylindrical projection is configured as a pivot bearing bolt, the cylindrical projection being pivotably supported in the assembly opening so as to define the pivot bearing.

5. The chain drive assembly according to claim 1,
wherein the at least one projection includes a pivot bearing opening, and that a pivot bearing bolt is provided, which is extendable through the pivot bearing opening so as to define the pivot bearing.

6. The chain drive assembly according to claim 1,
wherein, in addition to the first tensioning rail, a second tensioning rail is provided, said second tensioning rail being supported such that it is pivotable about the pivot bearing axle of the pivot bearing, wherein the first tensioning rail has provided thereon, on the side of the support body located opposite the at least one projection, at least one holding element for holding the second tensioning rail at a mounting position on the first tensioning rail while the second tensioning rail is being mounted on the first tensioning rail.

7. The chain drive assembly according to claim 6,
wherein the at least one holding element is configured as a stop projection protruding on the support body of the first tensioning rail in the direction of the second tensioning rail relative to the support body.

8. The use of a tensioning rail for mounting on an engine block of a internal combustion engine, with at least one projection arranged on a support body of the tensioning rail and protruding in the direction of the engine block relative to the support body, wherein the at least one projection is inserted into an assembly opening on the engine block so as to hold the tensioning rail at a mounting position.

9. The use of a tensioning rail according to claim 8, wherein the at least one projection is a cylindrical projection, which is arranged concentrically around the pivot bearing axle and which is inserted into a cylindrically formed assembly opening on the engine block so as to hold the tensioning rail at a mounting position.

10. The use of the first tensioning rail according to claim 8 and of a second tensioning rail for mounting a bipartite chain drive on the engine block, wherein the first tensioning rail has provided thereon, on the side of the support body located opposite the at least one projection, at least one holding element, and the second tensioning rail rests on the holding element of the first tensioning rail at a mounting position, so as to fix the second tensioning rail simultaneously with the first tensioning rail on the engine block.

11. A mounting method for a bipartite chain drive of an internal combustion engine, comprising a first tensioning rail and a second tensioning rail, which are supported so as to be pivotable about a pivot bearing axle of a pivot bearing provided on the engine block, wherein the engine block has provided thereon an assembly opening, the first tensioning rail includes at least one projection protruding in the direction of the engine block relative to the support body of the first tensioning rail, and said first tensioning rail additionally includes at least one holding element provided on the side of the support body located opposite the at least one projection, said mounting method comprising the following steps:

arranging the at least one projection of the first tensioning rail in the assembly opening on the engine block;

positioning the driving chain of the first chain drive along the first tensioning rail;

arranging the second tensioning rail on the at least one holding element of the first tensioning rail;

orienting the pivot bearing openings of the first and second tensioning rails concentrically with the pivot bearing axle;

inserting the bearing bolt into the bearing openings of the first and second tensioning rails; and fixing the bearing bolt in position in the engine block.

12. The mounting method for a bipartite chain drive according to claim 11, wherein the at least one projection is a cylindrical projection which is arranged concentrically around the pivot bearing axle, and that the assembly opening is a cylindrical assembly opening formed concentrically with the pivot bearing axle.

13. A bipartite chain drive for an internal combustion engine, comprising a first tensioning rail and a second tensioning rail, said first tensioning rail and said second tensioning rail being adapted to be supported such that they are pivotable about a pivot bearing axle of a pivot bearing provided on the engine block of the internal combustion engine, wherein the first tensioning rail comprises a cylindrical projection which is arranged concentrically around the pivot bearing axle and which projects in the direction of the engine block relative to the support body of the first tensioning rail, wherein the cylindrical projection is adapted to be accommodated in an assembly opening on the engine block so as to hold the first tensioning rail at a mounting position while said first tensioning rail is being mounted on the engine block, and wherein the first tensioning rail has provided thereon, on the side of the support body located opposite the cylindrical projection, at least one holding element so as to hold the second tensioning rail at a mounting position on the first tensioning rail while said second tensioning rail is being mounted on the engine block.

* * * * *